(12) United States Patent
Gould et al.

(10) Patent No.: US 11,724,663 B2
(45) Date of Patent: Aug. 15, 2023

(54) AIR BAG FOR OBLIQUE CRASH PROTECTION

(71) Applicant: ZF Passive Safety Systems US Inc., Washington, MI (US)

(72) Inventors: Douglas Gould, Lake Orion, MI (US); Gabriela Diaz, Royal Oak, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 0 days.

(21) Appl. No.: 17/355,950

(22) Filed: Jun. 23, 2021

(65) Prior Publication Data

US 2022/0410835 A1 Dec. 29, 2022

(51) Int. Cl.
*B60R 21/2338* (2011.01)
*B60R 21/203* (2006.01)
(Continued)

(52) U.S. Cl.
CPC ........ *B60R 21/2338* (2013.01); *B60R 21/013* (2013.01); *B60R 21/203* (2013.01); *B60R 21/231* (2013.01); *B60R 21/239* (2013.01); *B60R 2021/0004* (2013.01); *B60R 2021/0009* (2013.01); *B60R 2021/01225* (2013.01); *B60R 2021/01238* (2013.01); *B60R 2021/2395* (2013.01); *B60R 2021/23382* (2013.01); *B60R 2021/23384* (2013.01)

(58) Field of Classification Search
CPC .......... B60R 2021/23384; B60R 2021/23382; B60R 2021/0009; B60R 2021/0004; B60R 2021/2395; B60R 2021/0023; B60R 2021/01225; B60R 2021/01238; B60R 2021/23388; B60R 21/2338; B60R 21/203; B60R 21/013; B60R 21/233; B60R 21/231; B60R 21/239
USPC ............................................. 280/731, 743.2
See application file for complete search history.

(56) References Cited

U.S. PATENT DOCUMENTS 8,083,259 B2   12/2011   Schoenhuber et al.
9,205,798 B1 *  12/2015   Jindal ................... B60R 21/231
(Continued)

FOREIGN PATENT DOCUMENTS

GB        2415665 A  *  1/2006   ........... B60R 21/233

OTHER PUBLICATIONS

PCT International Search Report and Written Opinion for corresponding International Application Serial No. PCT/US2022/034423, dated Sep. 7, 2022, pp. 1-14.

*Primary Examiner* — Keith J Frisby
(74) *Attorney, Agent, or Firm* — Tarolli, Sundheim, Covell & Tummino LLP

(57) ABSTRACT

An apparatus for helping to protect an occupant of a vehicle includes an airbag configured to be mounted on a vehicle steering wheel. The airbag includes an inflatable main chamber configured to cover the steering wheel, and an inflatable lateral chamber configured to cover a vehicle A-pillar. The apparatus also includes a tether actuation unit and a tether connected to the tether actuation unit and to a portion of the airbag that helps define the lateral chamber. The tether actuation unit has an unactuated condition maintaining a connection with the tether that restricts deployment of the lateral chamber. The tether actuation unit also has an actuated condition releasing its connection with the tether and causing the lateral chamber to fully deploy.

21 Claims, 4 Drawing Sheets

(51) Int. Cl.
*B60R 21/013* (2006.01)
*B60R 21/231* (2011.01)
*B60R 21/239* (2006.01)
B60R 21/01 (2006.01)
B60R 21/00 (2006.01)

(56) References Cited

U.S. PATENT DOCUMENTS

| | | |
|---|---|---|
| 2006/0163848 A1 | 7/2006 | Abe |
| 2011/0210533 A1 | 9/2011 | Adachi |
| 2016/0311392 A1* | 10/2016 | Jindal .................. B60R 21/206 |
| 2017/0015266 A1* | 1/2017 | El-Jawahri ............. B60R 21/26 |
| 2017/0217399 A1 | 8/2017 | Patel et al. |
| 2018/0215340 A1 | 8/2018 | Zhang et al. |

* cited by examiner

AIR BAG FOR OBLIQUE CRASH PROTECTION

TECHNICAL FIELD

The invention relates to vehicle safety systems. More particularly, the invention relates to an inflatable vehicle occupant protection device for helping to protect an occupant of a vehicle. Still more particularly, the invention relates to an inflatable vehicle occupant protection device for helping to protect an occupant in the event of an oblique crash.

BACKGROUND

It is known to provide an inflatable vehicle occupant protection device, such as an air bag, for helping to protect an occupant of a vehicle. Air bags are deployable in response to the occurrence of an event for which occupant protection is desired, such as an impact to the vehicle, a vehicle collision, a vehicle rollover, or a combination thereof. Frontal collisions refer to collision events in which a vehicle experiences an impact at the front of the vehicle. These frontal collisions cause front seat vehicle occupants to move forward in the vehicle toward structures, such as the steering wheel (driver side occupant) and/or the instrument panel (passenger side occupant).

Frontal collisions of a vehicle can occur as a result of the vehicle travelling forward into an object, such as another vehicle, a tree, a pole, etc. Frontal collisions can also occur as a result of a stationary vehicle being impacted at the front by another vehicle. Frontal collisions can further occur as a result of two or more moving vehicles moving toward each other in a "head on" impact.

To help protect occupants of vehicles involved in frontal collisions, the vehicle can be equipped with frontal air bags. On the passenger side of the vehicle, frontal air bags are typically deployed from a housing located within the instrument panel of the vehicle. Because the occupant on the passenger side is not charged with operating the vehicle, the passenger frontal air bag can be configured to cover a large area in front of the front passenger seat, i.e., the instrument panel, windshield, etc., and can extend laterally, in both outboard and inboard directions in the vehicle, for example, from adjacent the passenger door to the centerline of the instrument panel or beyond.

On the driver side of the vehicle, frontal air bags are typically deployed from a housing located within the steering wheel. Because the occupant on the driver side is charged with operating the vehicle, the driver frontal air bag has to be configured with this in mind. For example, the operator may not be steering the vehicle in a straight forward direction at the time of the collision and, therefore, the steering wheel can be rotated when the air bag deploys. Because of this, steering wheel mounted air bags typically have a round/circular cushion configuration that coincides with the position and attitude of the steering wheel. Additionally, the driver frontal air bag must be configured taking into account that the operator of the vehicle will likely have one or both hands on the steering wheel at the time a collision takes place. Because of this, the steering wheel mounted air bag can be configured to have a diameter that is selected to provide adequate frontal impact protection while avoiding air bag deployment into contact with the operator's hands and arms.

One particular type of collision for which an air bag may be deployed can be referred to as an oblique collision. Oblique collisions are considered generally to be any non-frontal, i.e., any non-zero degree angle, vehicle collision. In its simplest form, a frontal, zero degree angle vehicle collision would involve a vehicle impacting, for example, a flat brick wall when the vehicle is travelling at a straight forward direction perpendicular to that wall. As a result of this impact, the occupant would move forward in a direction parallel to the vehicle axis and the direction of forward vehicle travel into contact with the deployed air bag. From this, it follows that an oblique collision, i.e., a non-frontal or non-zero angle collision, would be any collision scenario that results in the occupant moving relative to the central vehicle axis and direction of forward vehicle travel in a direction that is not parallel to the axis of straight forward vehicle travel.

Oblique collisions can occur in a variety of scenarios. For example, a vehicle travelling in a straight forward direction colliding with an angled surface, such as another vehicle oriented in a non-parallel manner, would be considered an oblique collision. As another example, an offset collision in which a vehicle collides with an object, such as another vehicle, that is offset laterally would be considered an oblique collision. This would be the case, for instance, in a vehicle collision in which the front passenger side bumper strikes the rear driver side bumper of another vehicle. As a further example, vehicles colliding when travelling in directions that are not parallel, i.e., at an angle, would be considered an oblique collision.

Because the size and extent of the steering wheel air bag is limited, the occurrence of an oblique collision presents unique challenges from an occupant safety perspective. This is because an oblique collision produces occupant movements in the vehicle that are also oblique, that is, the occupant moves obliquely relative to a central axis of the steering wheel and steering wheel mounted air bag. This movement can be forward-outboard (i.e., toward the door). Forward-outboard movement of a driver seat occupant in response to an oblique collision can result in the occupant striking the side structure of the vehicle. In particular, the occupant can strike the A-pillar. Because the A-pillar extends up to the vehicle roof, the impact between the occupant and the A-pillar can be in the area of the upper torso and head.

SUMMARY

The invention relates to vehicle safety systems. More particularly, the invention relates to an apparatus including an inflatable vehicle occupant protection device for helping to protect an occupant of a vehicle. Still more particularly, the invention relates to an apparatus including a vehicle occupant protection device for helping to protect an occupant of a driver seat of the vehicle in the event of an oblique vehicle crash.

According to a first example implementation, an apparatus for helping to protect an occupant of a vehicle includes an airbag configured to be mounted on a vehicle steering wheel. The airbag includes an inflatable main chamber configured to cover the steering wheel, and an inflatable lateral chamber configured to cover a vehicle A-pillar. The apparatus also includes a tether actuation unit and a tether connected to the tether actuation unit and to a portion of the airbag that helps define the lateral chamber. The tether actuation unit has an unactuated condition maintaining a connection with the tether that restricts deployment of the lateral chamber. The tether actuation unit also has an actuated condition releasing its connection with the tether and causing the lateral chamber to fully deploy.

According to one aspect of the first example implementation, the tether can maintain the lateral chamber inverted within the main chamber when the tether actuation unit is in the unactuated condition.

According to another aspect of the first example implementation, the tether can have a widened end portion configured to form a linear connection with the portion of the airbag that helps define the lateral chamber.

According to another aspect of the first example implementation, the apparatus can also include an inflator for inflating the airbag, at least one crash sensor, and an airbag control unit that is operatively connected to the inflator, the tether actuation unit, and to the at least one crash sensor. The airbag control unit can be configured to identify the occurrence of a vehicle crash in response to signals received from the at least one crash sensor and to discriminate a frontal vehicle crash from an oblique vehicle crash. The airbag control unit can be configured to actuate the inflator in response to detecting a frontal vehicle crash, and to actuate the inflator and the tether actuation unit in response to detecting an oblique vehicle crash.

According to another aspect of the first example implementation, the apparatus can include a passive vent for venting inflation fluid from the airbag. In this instance, the inflator can be configured to supply a volume of inflation fluid to the airbag sufficient to produce a desired pressurization of the airbag regardless of whether the lateral chamber is fully deployed.

According to another aspect of the first example implementation, the apparatus can include an active vent that is actuatable to vent inflation fluid from the airbag. In this instance, a vent tether connects the vent to the tether actuation unit. The vent tether is configured to actuate the active vent in response to actuation of the tether actuation unit.

According to the preceding aspect of the first example implementation, the active vent can be maintained in an open condition due to the vent tether being connected to the tether actuation unit. The active vent can be configured to close in response to actuation of the tether actuation unit, which releases the vent tether.

According to another aspect of the first example implementation, the apparatus can be implemented in an airbag module.

According to another aspect of the first example implementation, the apparatus can be implemented in a vehicle safety system.

According to a second example implementation, an apparatus for helping to protect an occupant of a vehicle includes an airbag configured to be mounted on a vehicle steering wheel. The airbag includes an inflatable main chamber configured to cover the steering wheel and an inflatable lateral chamber configured to cover a vehicle A-pillar. The apparatus also includes an inflator for inflating the airbag, at least one crash sensor, and an airbag control unit that is operatively connected to the at least one crash sensor. The airbag control unit is configured to identify the occurrence of a vehicle crash in response to signals received from the at least one crash sensor, and to discriminate a frontal vehicle crash from an oblique vehicle crash. The airbag control unit is also configured to cause the main chamber to deploy in response to detecting a frontal vehicle crash, and to cause the main chamber and the lateral chamber to deploy in response to detecting an oblique vehicle crash.

According to one aspect of the second example implementation, the apparatus can also include a tether actuation unit and a tether connected to the tether actuation unit and to a portion of the airbag that helps define the lateral chamber. The airbag control unit can be configured to maintain the tether actuation unit in an unactuated condition in response to detecting a frontal vehicle crash. The tether actuation unit, when in the unactuated condition, can maintain a connection with the tether that restricts deployment of the lateral chamber. The airbag control unit can be configured to actuate the tether actuation unit to release the connection with the tether, which causes the lateral chamber to fully deploy.

According to another aspect of the second example implementation, the tether can maintain the lateral chamber inverted within the main chamber when the tether actuation unit is in the unactuated condition.

According to another aspect of the second example implementation, the tether can have a widened end portion configured to form a linear connection with the portion of the airbag that helps define the lateral chamber.

According to another aspect of the second example implementation, the apparatus can also include a passive vent for venting inflation fluid from the airbag. The inflator can be configured to supply a volume of inflation fluid to the airbag sufficient to produce a desired pressurization of the airbag regardless of whether the lateral chamber is deployed.

According to another aspect of the second example implementation, the apparatus can also include an active vent that is actuatable to vent inflation fluid from the airbag, and a vent tether that connects the vent to the tether actuation unit. The vent tether can be configured to actuate the active vent in response to actuation of the tether actuation unit.

According to another aspect of the second example implementation, the active vent can be maintained in an open condition due to the vent tether being connected to the tether actuation unit. The active vent can also be configured to close in response to actuation of the tether actuation unit, which releases the vent tether.

According to another aspect of the second example implementation, the apparatus can also include a housing for supporting the airbag and the inflator and for storing the airbag in a deflated condition. The tether actuation unit can be connected to the housing.

According to another aspect of the second example implementation, the apparatus can be implemented in an airbag module.

According to another aspect of the second example implementation, the apparatus can be implemented in a vehicle safety system.

DRAWINGS

DESCRIPTION

The invention relates to an air bag that helps protect an occupant of a vehicle in the event of an oblique collision.

Those skilled in the art will appreciate that the invention could be adapted structurally to help protect occupants of any seating position in the vehicle, such as front driver seat occupants, front passenger seat occupants, or rear seat occupants. The air bag of the example configuration disclosed herein is a driver frontal airbag that is adapted to help protect the driver seat occupant in the event of an oblique crash.

Figure 1:
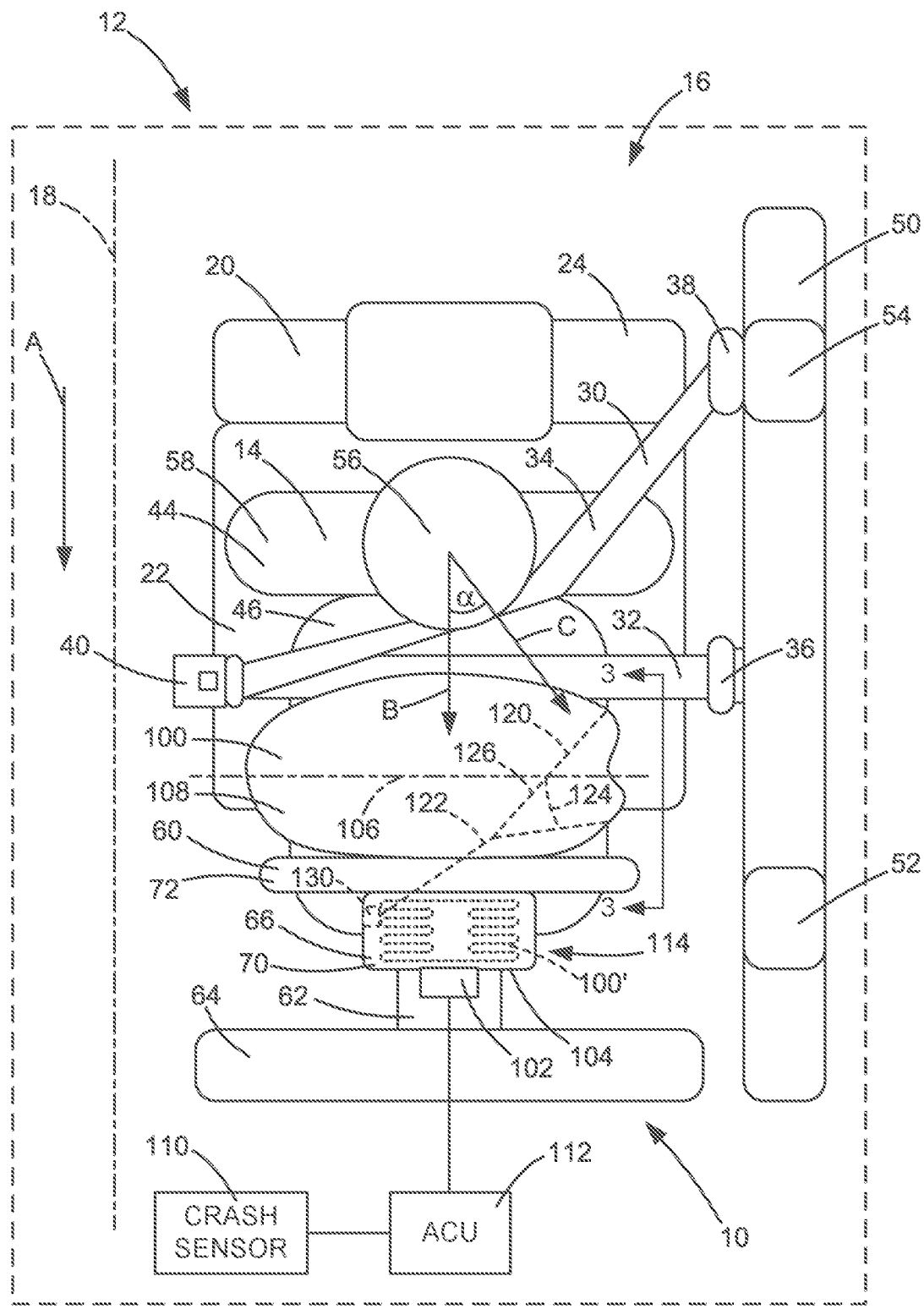
FIG. 1 is a schematic illustration of a vehicle including a safety system for helping to protect an occupant of the vehicle, illustrating the system in a first deployed condition.

Referring to FIG. 1, a vehicle 12 includes a vehicle safety system 10 for helping to protect an occupant 14. More specifically, the vehicle safety system 10 helps protect an occupant 14 of a front seat 20 on a driver side 16 of the vehicle 12. The driver side 16 of the vehicle 12 is defined generally as the side of the vehicle from which a vehicle operator or driver controls or operates the vehicle.

Figure 2:
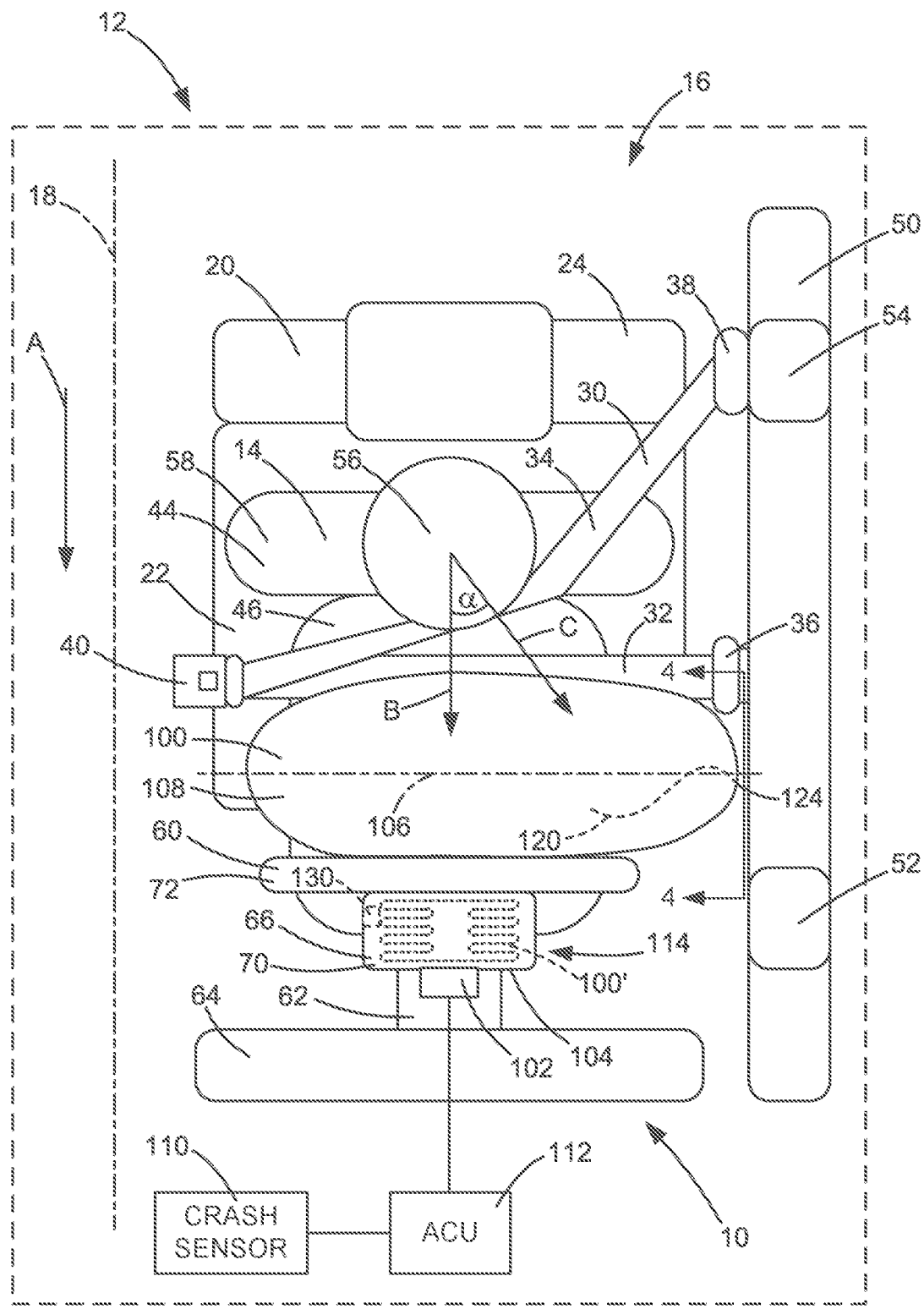
FIG. 2 is a schematic illustration of the vehicle safety system of FIG. 1 in a second deployed condition.

The driver side 16 is the side of the vehicle to the left of a vehicle centerline 18, as viewed from the perspective of the occupant 14 in a normally seated position (as shown) and looking in the direction of forward vehicle travel, as indicated generally by the arrow labeled A in FIGS. 1-2. Those skilled in the art will appreciate that in some countries, such as England, the driver side of the vehicle can be opposite of that illustrated in FIGS. 1-2. Those skilled in the art will further appreciate that all of the features of the system 10 described herein are equally applicable to vehicles having this "right side driver" configuration.

The vehicle seat 20 includes a seat base or bottom 22 and a seat back 24. The safety system 10 includes a seatbelt 30 for helping to restrain the occupant 14 in the seat 20. The seatbelt 30 includes a lap belt portion 32 and a shoulder belt portion 34. The seatbelt 30 has a first end connected to the vehicle 12 at an anchor point 36 located outboard of the vehicle seat bottom 22. The seatbelt 30 has an opposite second end connected to a retractor 38 connected to a side structure 50 of the vehicle, such as a B-pillar 54, at a location generally at or above an upper extent of the seat back 24.

Between the anchor point 36 and the D-ring/retractor 38, the seatbelt extends through a buckle 40 that is detachably anchored to the vehicle 12 on an inboard side of the seat bottom 22. The shoulder belt portion 34 extends from the retractor 38, over the occupant's outboard shoulder 42, and across the torso 44 to the buckle 40 located in the region adjacent the occupant's hip 46. The lap belt portion 32 extends from the buckle 40, across the occupant's lap, i.e., the hips 46 and legs, to the anchor point 36.

The vehicle 12 includes a steering wheel 60 that is connected to a steering column 62 extending from an instrument panel 64 of the vehicle. The steering wheel 60 includes a central hub 70 and a rim 72 that encircles the hub. The occupant 14 can grasp the rim 72 to manipulate the steering wheel 60 to steer the vehicle 12 in a known manner.

Referring to FIGS. 1 and 2, the safety system 10 also includes a driver frontal air bag 100 that is mounted in a housing 104 formed in the steering wheel hub 70. The frontal air bag 100 has a stored condition, illustrated in dashed lines at 100' in FIGS. 1 and 2, in which the air bag is folded, rolled, or otherwise placed within the housing 104 in the steering wheel hub 70. The frontal air bag 100 is inflatable from the stored condition (dashed lines at 100') to the deployed condition (solid lines at 100). The safety system 10 includes an inflator 102 that is actuatable to produce inflation fluid for inflating the frontal air bag 100 in a known manner. The airbag 100, inflator 102, and housing 104 can be components of an airbag module 114 that can be installed in the vehicle as a unit.

The safety system 10 also includes one or more crash sensors 110 for sensing vehicle conditions, such as accelerations. The crash sensors 110 are operatively connected to a controller, referred to as an airbag control unit or "ACU" 112. The ACU 112 monitors the vehicle condition signals from the crash sensors 110 and makes vehicle crash determinations based on algorithms implemented in the controller. In response to determining that a vehicle crash has occurred, the ACU 112 actuates the inflator 102, which causes the airbag 100 to inflate and deploy. The air bag 100, when inflated and deployed, is positioned between the occupant 14 and structure of the vehicle 12, such as the steering wheel 60 and the instrument panel 64, and helps protect the occupant from impacts with that structure.

There are many vehicle collision/impact scenarios for which the frontal air bag 100 can help protect the vehicle occupant 14. For example, the frontal air bag 100 can help protect the occupant 14 if the vehicle 12 is involved in a frontal impact. This is shown in FIG. 1. A frontal impact is meant to refer to scenarios where the impact results in the occupant 14 moving forward in the vehicle 12 in a direction generally parallel to the vehicle centerline 18 and the direction of forward vehicle travel (see arrow A). In the event of a frontal impact, the occupant 14 moves forward in the vehicle 12 in a direction indicated generally by the arrow labeled B in FIG. 1 toward the steering wheel 60.

When a frontal impact occurs, the frontal air bag 100 can be sufficient to provide adequate protection to the occupant 14. Because the occupant 14 travels generally in the direction B toward the steering wheel 60, the occupant impacts the frontal air bag 100 squarely, moving substantially perpendicular to a lateral axis 106 of the frontal air bag. Because of this, the frontal air bag 100 receives and absorbs or dissipates the vast majority of the forces of the impacting occupant.

An oblique impact is meant to refer to scenarios where the impact results in the occupant 14 moving obliquely forward in the vehicle 12 in a direction that is non-parallel to the vehicle centerline 18 and the direction of forward vehicle travel (see arrow A). This is shown in FIG. 2. In the event of an oblique impact, the occupant 14 moves forward in the vehicle 12 in a direction that is angled either inboard of the vehicle (i.e., toward the vehicle centerline 18) or outboard of the vehicle (i.e., toward the vehicle side structure 50).

Outboard oblique movement of the occupant 14 is indicated generally by the arrow labeled C in FIG. 2. As shown, this outboard occupant movement is at an angle indicated generally at a in FIG. 2. As shown, the outboard movement is directed toward the side structure 50 and, particularly, the A-pillar 52. The A-pillar 52 extends to the vehicle roof. Because of this, the occupant 14, moving in response to an oblique impact (see, e.g., arrow C) can impact the A-pillar 52 with his/her head 56 and/or upper torso 58.

Advantageously, the vehicle safety system 10 is configured to adapt the configuration of the airbag 100 in response to detecting the occurrence of an oblique vehicle crash. Referring to FIGS. 1-4, the airbag 100 is configured to have a lateral chamber 120 that expands the coverage of the airbag laterally so that the airbag is positioned between the occupant 14 and the side structure 50 of the vehicle 12, particularly the A-pillar 52. The lateral chamber 120 can be delineated from the main or central chamber 108 of the airbag 100, for example, by shape-maintaining internal walls or tethers (not shown).

Alternatively, as shown, the lateral chamber 120 can be an extension of the main chamber 108 that extends the coverage of that chamber and is free from shape-maintaining internal walls or tethers.

Figure 4:
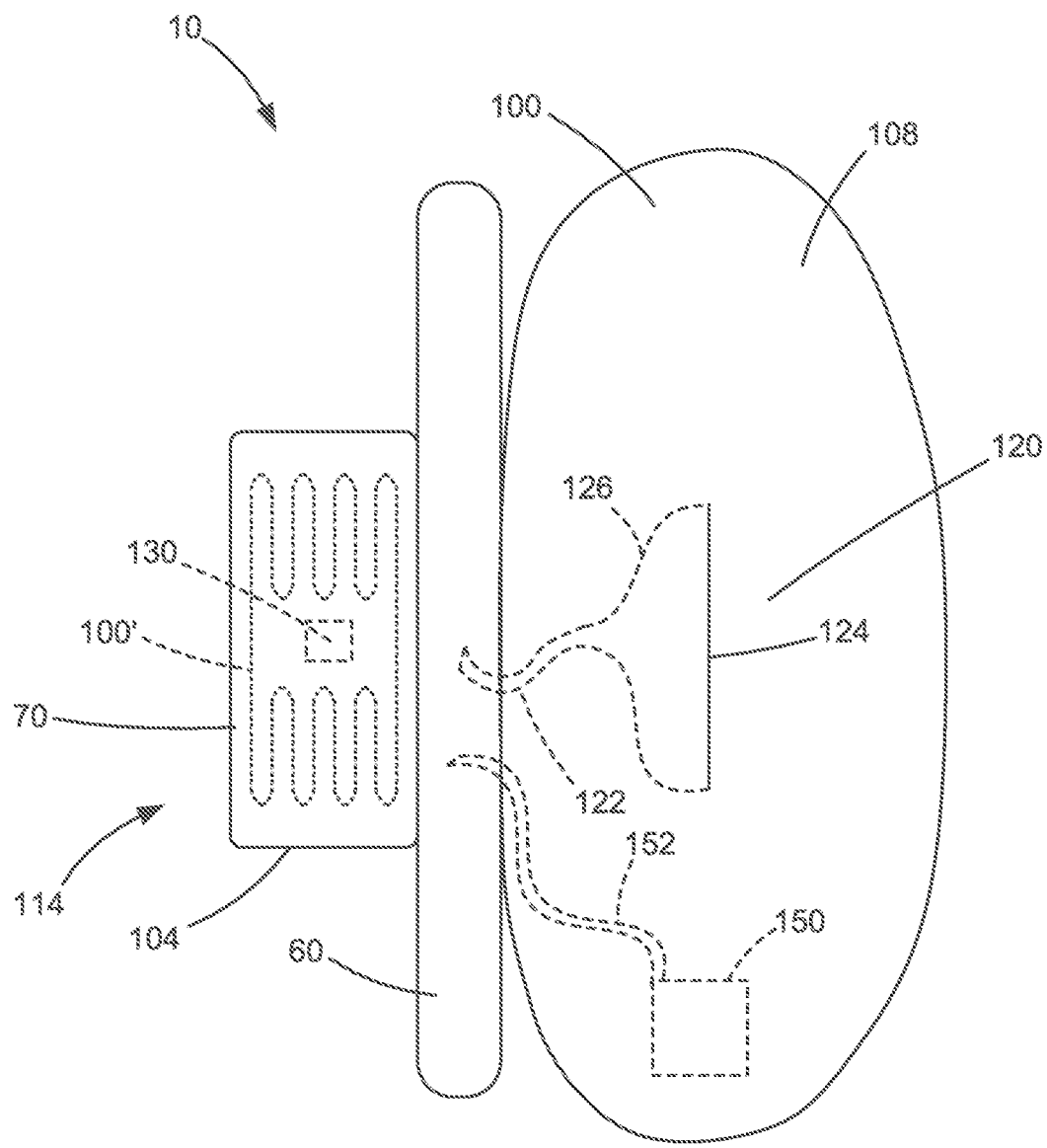
FIG. 4 is a schematic side view taken generally along line 4-4 in FIG. 2.

To implement the lateral chamber 120, the airbag 100 includes a tether 122 that is connected to a laterally outboard portion of the airbag fabric. This connection is illustrated generally at 124. As best shown in FIG. 4, the connection 124 extends linearly along the airbag fabric. This linear connection 124 can, for example, be a stitched or welded connection. To facilitate the linearity of the connection 124, the tether 122 can include an outward flared end 126 that produces the desired length of the linear connection.

Figure 3:
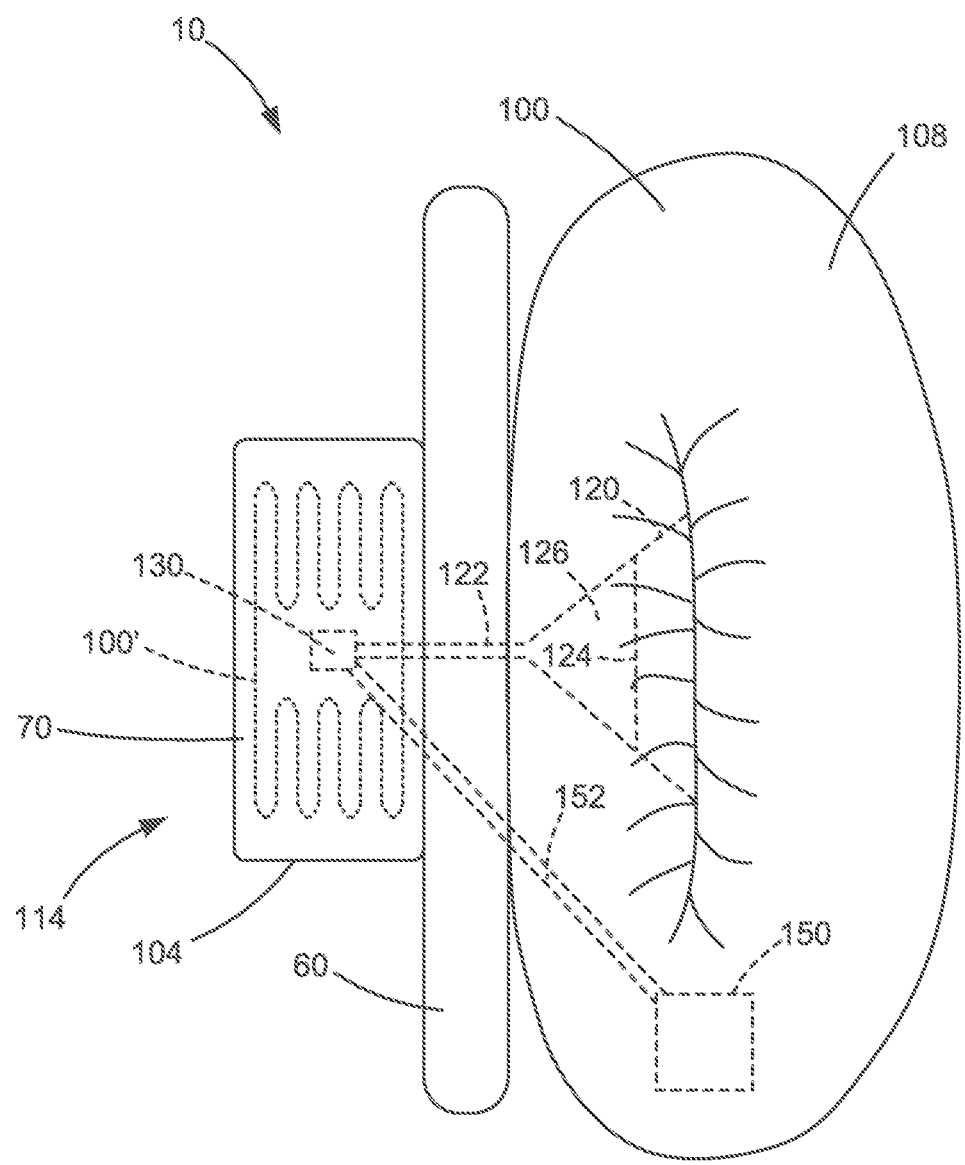
FIG. 3 is a schematic side view taken generally along line 3-3 in FIG. 1.

The tether 122 is anchored in the airbag module 114 by a tether actuation unit or "TAU" 130. The TAU 130 is operatively connected to the ACU 112, which is configured to be selectively actuated by the ACU 112. In the non-actuated condition, the TAU 130 maintains the anchoring of the tether 122 to the airbag module 114, which maintains the airbag 100 in a frontal impact condition, which is illustrated in FIGS. 1 and 3. In the actuated condition, the TAU 130 releases the tether 122 from its anchored connection to the airbag module 114, which allows the lateral chamber 120 to deploy, thus placing the airbag 100 in an oblique impact condition, which is illustrated in FIGS. 2 and 4.

The TAU 130 can have any configuration that can both maintain the connection of the tether 124 in the unactuated condition, and also release its connection with the tether in a repeatable and reliable manner when actuated. In one example configuration, the TAU 130 is a pyrotechnic actuation device in which a pyrotechnic material is ignited to actuate the device. Ignition of the pyrotechnic material causes the TAU 130 to rupture which, in turn, releases the tether 124 and the lateral chamber 120, causing the airbag to inflate and deploy to the oblique impact condition illustrated in FIG. 2. An example of the type of pyrotechnic actuator device that can be implemented is described in U.S. Pat. No. 8,083,259 B2, which issued on Dec. 27, 2011 and is assigned to TRW Airbag Systems GmbH of Aschau Am Inn, Germany. The disclosure of U.S. Pat. No. 8,083,259 B2 is hereby incorporated by reference in its entirety.

When the ACU 112 senses a crash, such as a frontal crash, for which protection of a forward-moving occupant 14 is desired (see, arrow B in FIG. 1), the ACU can maintain the TAU 130 in the unactuated condition and thereby main the connection of the tether 122 to the airbag module 114. The airbag 100 thus inflates and deploys to the frontal impact condition of FIGS. 1 and 3. In the frontal impact condition of FIG. 1, the frontal air bag 100 covers the steering wheel 60 and helps protect the occupant 14 from impacts with the steering wheel by cushioning impacts with the occupant and helping to provide a controlled deceleration or "ride down" effect.

As shown in FIG. 3, in the unactuated condition of the TAU 130, the tether 122 restrains deployment of the lateral chamber 120. The tension applied by the tether 122 restricts movement of the lateral chamber 120, causing it to be inverted inside the main chamber 108. As such, in the frontal impact condition of FIGS. 1 and 3, the airbag 100 maintains the generally round cushion configuration on the steering wheel 60 that is typical of steering wheel-mounted frontal airbags.

When the ACU 112 senses an oblique crash for which protection of an oblique-moving occupant 14 is desired (see, arrow C in FIG. 2), the ACU can acuate the TAU 130 to release the tether 124, which allows the lateral chamber 120 to fully deploy to the oblique impact condition, as shown in FIGS. 2 and 4. In the oblique impact condition of FIG. 2, the frontal air bag 100 covers the steering wheel 60, side structure 50, and A-pillar 52, and helps protect the occupant 14 from impacts with the steering wheel, side structure, and A-pillar by cushioning impacts with the occupant and helping to provide a controlled deceleration or "ride down" effect.

When the airbag 100 is placed in the oblique impact condition of FIGS. 2 and 4, its volume is increased. Accordingly, the inflator 102 can be configured and sized to provide a volume of inflation fluid sufficient to inflate, deploy, and pressurize the airbag 100 when in the oblique impact condition. This being the case, it will be appreciated that the variable volume of the airbag 100, coupled with the inflator 102 being designed for the oblique impact condition, can result in the production of excess inflation fluid in the frontal impact condition of the airbag 100. This can be accounted for in a variety of manners.

For example, referring to FIGS. 3 and 4, the airbag 100 can include one or more vents 150, either active or passive, that vent inflation fluid from the airbag in order to control or otherwise regulate airbag pressurization. In a passive configuration, the vent 150 can vent inflation fluid regardless of whether the airbag 100 is in the frontal impact condition or oblique impact condition. In this configuration, the inflator 102 would be configured and sized to produce a volume of inflation fluid sufficient to inflate, deploy, and pressurize the airbag 100 in the higher volume oblique impact condition. The passive vent 150 would vent a greater volume of inflation fluid in the frontal impact condition than it would in the oblique impact condition.

In an active vent configuration, the vent 150 can be configured to vent inflation fluid in the frontal impact condition and to block inflation fluid venting when in the oblique impact condition. In one instance, in addition to controlling the deployment of the lateral chamber 120, the TAU 130 can also control the actuation of the vent 150. This can be done, for example, via the inclusion of a vent tether 152 connected to both the vent 150 and the TAU 130. In this instance, the vent 150 can be a normally open vent, meaning that the vent is maintained in the open condition, venting inflation fluid from the airbag 100, until actuated closed. Thus, the connection of the tether 152 to the TAU 130 can maintain the vent 150 in the open condition in the frontal impact condition of the airbag 100. In the oblique impact condition, the TAU 130 can release the vent tether 152 simultaneously with the airbag tether 120, which releases the lateral chamber 120 to inflate and deploy while, at the same time, blocking inflation fluid venting from the airbag 100.

From the above description of the invention, those skilled in the art will perceive applications, improvements, changes and modifications to the invention. Such applications, improvements, changes and modifications within the skill of the art are intended to be covered by the appended claims.

The invention claimed is:

1. An apparatus for helping to protect an occupant of a vehicle, comprising:
   an airbag configured to be mounted on a vehicle steering wheel, the airbag comprising an inflatable main chamber configured to cover the steering wheel, and an inflatable lateral chamber configured to cover a vehicle A-pillar;
   a tether actuation unit; and
   a tether connected to the tether actuation unit and to a portion of the airbag that helps define the lateral chamber;
   wherein the tether actuation unit has an unactuated condition maintaining a connection with the tether that restricts deployment of the lateral chamber, and wherein the tether actuation unit has an actuated condition releasing its connection with the tether and causing the lateral chamber to fully deploy, wherein the tether maintains the lateral chamber inverted within the main chamber when the tether actuation unit is in the unactuated condition.

2. The apparatus recited in claim 1, wherein the tether has a widened end portion configured to form a linear connection with the portion of the airbag that helps define the lateral chamber.

3. The apparatus recited in claim 1, further comprising:
an inflator for inflating the airbag;
at least one crash sensor; and
an airbag control unit that is operatively connected to the inflator, the tether actuation unit, and to the at least one crash sensor;
wherein the airbag control unit is configured to identify the occurrence of a vehicle crash in response to signals received from the at least one crash sensor, the airbag control unit being further configured to discriminate a frontal vehicle crash from an oblique vehicle crash; and
wherein the airbag control unit is configured to actuate the inflator in response to detecting a frontal vehicle crash, and to actuate the inflator and the tether actuation unit in response to detecting an oblique vehicle crash.

4. The apparatus recited in claim 3, wherein the inflator is configured to supply a volume of inflation fluid to the airbag sufficient to produce a desired pressurization of the airbag regardless of whether the lateral chamber is fully deployed.

5. A vehicle safety system comprising the apparatus recited in claim 3.

6. An airbag module comprising:
the apparatus recited in claim 1;
an inflator for inflating the airbag; and
a housing for supporting the airbag and the inflator and for storing the airbag in a deflated condition, wherein the tether actuation unit is connected to the housing.

7. A vehicle safety system comprising:
the airbag module recited in claim 6;
at least one crash sensor; and
an airbag control unit that is operatively connected to the inflator, the tether actuation unit, and to the at least one crash sensor, wherein the airbag control unit is configured to control actuation of the inflator and the tether actuation unit in response to the at least one crash sensor.

8. The apparatus recited in claim 1, further comprising an active vent that is actuatable to vent inflation fluid from the airbag, wherein a vent tether connects the vent to the tether actuation unit, the vent tether being configured to actuate the active vent in response to actuation of the tether actuation unit.

9. The apparatus recited in claim 8, wherein the active vent is maintained in an open condition due to the vent tether being connected to the tether actuation unit, the active vent being configured to close in response to actuation of the tether actuation unit, which releases the vent tether.

10. An apparatus for helping to protect an occupant of a vehicle, comprising:
an airbag configured to be mounted on a vehicle steering wheel, the airbag comprising an inflatable main chamber configured to cover the steering wheel, and an inflatable lateral chamber configured to cover a vehicle A-pillar;
a tether actuation unit; and
a tether connected to the tether actuation unit and to a portion of the airbag that helps define the lateral chamber;
wherein the tether actuation unit has an unactuated condition maintaining a connection with the tether that restricts deployment of the lateral chamber, and wherein the tether actuation unit has an actuated condition releasing its connection with the tether and causing the lateral chamber to fully deploy, wherein the tether has a widened end portion configured to form a linear connection with the portion of the airbag that helps define the lateral chamber.

11. An apparatus for helping to protect an occupant of a vehicle, comprising:
an airbag configured to be mounted on a vehicle steering wheel, the airbag comprising an inflatable main chamber configured to cover the steering wheel, and an inflatable lateral chamber configured to cover a vehicle A-pillar;
a tether actuation unit;
a tether connected to the tether actuation unit and to a portion of the airbag that helps define the lateral chamber, wherein the tether actuation unit has an unactuated condition maintaining a connection with the tether that restricts deployment of the lateral chamber, and wherein the tether actuation unit has an actuated condition releasing its connection with the tether and causing the lateral chamber to fully deploy;
an inflator for inflating the airbag;
at least one crash sensor; and
an airbag control unit that is operatively connected to the inflator, the tether actuation unit, and to the at least one crash sensor;
wherein the airbag control unit is configured to identify the occurrence of a vehicle crash in response to signals received from the at least one crash sensor, the airbag control unit being further configured to discriminate a frontal vehicle crash from an oblique vehicle crash;
wherein the airbag control unit is configured to actuate the inflator in response to detecting a frontal vehicle crash, and to actuate the inflator and the tether actuation unit in response to detecting an oblique vehicle crash; and
wherein the apparatus further comprises an active vent that is actuatable to vent inflation fluid from the airbag, wherein a vent tether connects the vent to the tether actuation unit, the vent tether being configured to actuate the active vent in response to actuation of the tether actuation unit.

12. The apparatus recited in claim 11, wherein the active vent is maintained in an open condition due to the vent tether being connected to the tether actuation unit, the active vent being configured to close in response to actuation of the tether actuation unit, which releases the vent tether.

13. A vehicle safety system comprising the apparatus recited in claim 11.

14. An airbag module comprising:
the apparatus recited in claim 11; and
a housing for supporting the airbag and the inflator and for storing the airbag in a deflated condition, wherein the tether actuation unit is connected to the housing.

15. An apparatus for helping to protect an occupant of a vehicle, comprising:
an airbag configured to be mounted on a vehicle steering wheel, the airbag comprising an inflatable main chamber configured to cover the steering wheel, and an inflatable lateral chamber configured to cover a vehicle A-pillar;

a tether actuation unit;

a tether connected to the tether actuation unit and to a portion of the airbag that helps define the lateral chamber;

wherein the tether actuation unit has an unactuated condition maintaining a connection with the tether that restricts deployment of the lateral chamber, and wherein the tether actuation unit has an actuated condition releasing its connection with the tether and causing the lateral chamber to fully deploy; and wherein the apparatus further comprises an active vent that is actuatable to vent inflation fluid from the airbag, wherein a vent tether connects the vent to the tether actuation unit, the vent tether being configured to actuate the active vent in response to actuation of the tether actuation unit.

16. The apparatus recited in claim 15, wherein the active vent is maintained in an open condition due to the vent tether being connected to the tether actuation unit, the active vent being configured to close in response to actuation of the tether actuation unit, which releases the vent tether.

17. The apparatus recited in claim 15, further comprising:
an inflator for inflating the airbag;
at least one crash sensor; and
an airbag control unit that is operatively connected to the inflator, the tether actuation unit, and to the at least one crash sensor;
wherein the airbag control unit is configured to identify the occurrence of a vehicle crash in response to signals received from the at least one crash sensor, the airbag control unit being further configured to discriminate a frontal vehicle crash from an oblique vehicle crash; and
wherein the airbag control unit is configured to actuate the inflator in response to detecting a frontal vehicle crash, and to actuate the inflator and the tether actuation unit in response to detecting an oblique vehicle crash.

18. The apparatus recited in claim 17, wherein the inflator is configured to supply a volume of inflation fluid to the airbag sufficient to produce a desired pressurization of the airbag regardless of whether the lateral chamber is fully deployed.

19. A vehicle safety system comprising the apparatus recited in claim 15.

20. An airbag module comprising:
the apparatus recited in claim 15;
an inflator for inflating the airbag; and
a housing for supporting the airbag and the inflator and for storing the airbag in a deflated condition, wherein the tether actuation unit is connected to the housing.

21. A vehicle safety system comprising:
the airbag module recited in claim 20;
at least one crash sensor; and
an airbag control unit that is operatively connected to the inflator, the tether actuation unit, and to the at least one crash sensor, wherein the airbag control unit is configured to control actuation of the inflator and the tether actuation unit in response to the at least one crash sensor.

* * * * *